ника
3,704,294
PROCESS FOR PREPARING 6-AMINO-
PENICILLANIC ACID COMPOUNDS
Yukichi Kishida, Nobuo Soma, Junichi Nakazawa, Yoshio Sato, Hidebumi Matsuda, Atsusuke Terada, Taiichiro Watanabe, Yukio Sugimura, Toshihide Miyamura, and Masanao Kaneko, Tokyo, Japan, and Mitsuo Watatani, deceased, late of Tokyo, Japan, by Takako Watatani, heiress, Yokohama, Japan, assignors to Sankyo Company Limited, Tokyo, Japan
No Drawing. Filed Mar. 19, 1970, Ser. No. 21,180
Claims priority, application Japan, Mar. 25, 1969, 44/22,553; Mar. 29, 1969, 44/24,207
Int. Cl. C07d 99/16
U.S. Cl. 260—239.1                    10 Claims

ABSTRACT OF THE DISCLOSURE

Improved production of a 3-phenyl-5-methyl-4-isoxazolylpenicillin compound, useful as antibacterial agents, is effected by reacting a 1-tetrolylcycloheptaimidazol-2(1H)-one with a benzonitrile N-oxide compound to form a 1-[3-phenyl - 5 - methylisoxazole - 4 - carbonyl]cycloheptimidazol-2(1H)-one compound and then reacting said compound with 6-aminopencillanic acid.

This invention relates to a novel process for preparing 6-aminopenicillanic acid compounds having the general formula (I)
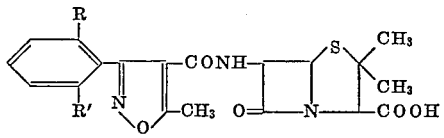

wherein R and R' may be the same or different and each represents a hydrogen atom or a halogen atom such as fluorine, bromine, chlorine (which is preferred) or iodine and non-toxic salts thereof. These are known antibacterial antibiotics disclosed in U.S. Pats. 2,996,501 and 3,239,507.

Heretofore, the penicillanic acid compounds having the aforementioned general Formula I have been prepared, according to the foregoing patents, by reacting 6-aminopenicillanic acid with an acid halide, acid anhydride or mixed acid anhydride of phenylisoxazolecarboxylic acid with or without one or more substituent halogen atoms on the phenyl group. Preparation of the active isoxazole derivative used in the reaction with 6-aminopenicillanic acid in the above-cited process involves the following steps: condensation of a benzohydroxamoyl chloride derivative with an aceto-acetic ester to form an isoxazolecarboxylic acid ester, hydrolysis of the ester to give the free isoxazolecarboxylic acid and reaction of the resulting carboxylic acid, for example, with thionyl chloride to produce the active acid chloride.

We have now discovered a simple process for preparing novel types of isoxazole compounds which are reactive with 6-aminopenicillanic acid. By the use of this process 6-aminopenicillanic acid derivatives can be produced with great economic advantages.

According to the process of this invention, the compound of Formula I is prepared by reacting a compound of the formula (II)
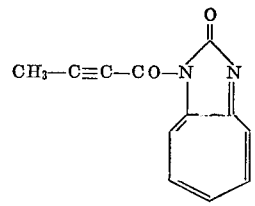

with a nitrile oxide of the general formula (III)
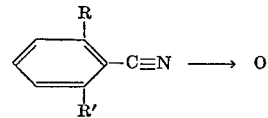

wherein R and R' have the same meaning as in Formula I, to form a cycloheptimidazolone compound of the general formula (IV)
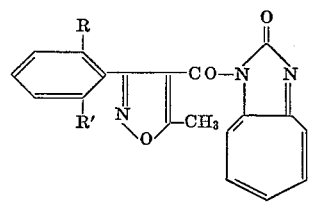

wherein R and R' have the same meaning as above, and then reacting said compound with 6-aminopenicillanic acid in the presence or absence of a base. While the new type of active isoxazole compounds having the Formula IV are produced in very stable crystalline form by the process of this invention, they are unexpectedly so reactive with amines that they are readily reacted with 6-aminopenicillanic acid to give the desired products of high purity in high yield.

The preparation of active isoxazole derivatives such as the acid chloride used in the prior process requires the reaction of the carboxylic acid with a chlorinating agent such as thionyl chloride. This reaction not only is associated with the evolution of toxic hydrogen chloride and sulfur dioxide gases, but also requires use of a special acid-proof apparatus, and makes the process troublesome from the industrial point of view.

According to the process of this invention, such disadvantages are not involved in the preparation of a compound of Formula IV. In addition, the acylation reaction of 6-aminopenicillanic acid with said compound produces almost no change of pH of the reaction medium during the reaction and can be effected throughout a pH range at which 6-aminopenicillanic acid and the product are stable. Moreover, cycloheptimidazol-2(1H)-one is precipitacted in situ as a by-product and thus it may be easily recovered and reused for the preparation of the starting material (II).

The formation of the compound of Formula IV in the process of this invention is easily effected by contacting a compound of Formula II with a nitrile oxide of Formula III, preferably in an inert solvent. Any solvent that will not participate in said reaction may be used, including, for example, hydrocarbons such as benzene and toluene, ethers such as tetrahydrofuran and dioxane, esters such as ethyl acetate, aliphatic ketones such as acetone and methyl isobutyl ketone, dimethylformamide and dimethylacetamide and mixtures thereof with water. Usually ethers such as tetrahydrofuran or hydrocarbons such as benzene are used. There is no limitation on the reaction temperature, but it is desirable to carry out the reaction at a temperature from room temperature to about 130° C. The reaction is completed usually in about 10 minutes to 24 hours, depending mainly upon the kind of solvent used and the reaction temperature.

After completion of the reaction, the compound of Formula IV is isolated from the reaction mixture by conventional means. For example, the reaction mixture is concentrated and the residue is recrystallized from a solvent such as, for example, benzene or cyclohexane to afford the compound of Formula IV in pure form.

The reaction of the compound of Formula IV thus obtained with 6-aminopenicillanic acid, for the formation of the desired product having the Formula I, is carried out by suspending or dissolving 6-aminopenicillanic acid in a solvent followed by the addition of a compound of Formula IV. However, as 6-aminopenicillanic acid is sparingly soluble in conventional solvents, it is preferable to employ a salt of 6-aminopenicillanic acid, such as the sodium or tiethylamine salt, or to add an equimolar amount of a base to the reaction mixture to form the salt of 6-aminopenicillanic acid in situ, thus dissolving the latter, followed by addition of a compound of Formula IV for the reaction. The solvent for the reaction may be any solvent that will not participate in the reaction, for example, water, lower alkanols such as methanol, ethanol, propanol and butanol, lower alkyl ketones such as acetone and methyl ethyl ketone, acyclic or cyclic ethers such as diethyl ether, tetrahydrofuran and dioxane, halogenated hydrocarbons such as methylene chloride and chloroform, dimethylformamide, hexamethylphosphoric acid triamide and mixtures thereof. Especially preferable are aqueous acetone, aqueous alcohols and mixtures thereof with hexamethylphosphoric triamide. There is no particular limitation on the base used for forming the salt of 6-aminopenicillanic acid, which may include, for example, tertiary amines, e.g., alkylamines such as triethylamine, tributylamine or trioctylamine, N-methylpiperidine, N-methylmorpholine and triethylenediamine, aromatic heterocyclic amines such as pyridine and quinoline, alcoholates such as sodium ethylate, inorganic alkali metal compounds such as sodium hydroxide, potassium hydroxide, sodium carbonate, potassium carbonate, sodium bicarbonate and potassium bicarbonate. Especially preferable for the use are tertiary amines such as triethylamine. No particular limitation is given to the reaction temperature. The reaction proceeds usually at room temperature but may be carried out at higher or lower temperatures. The period of time required for the reaction depends mainly upon the solvent used and the reaction temperature. The reaction is usually completed in about 2 to 10 hours.

After completion of the reaction, the desired product is isolated from the reaction mixture by conventional means. For example, the cycloheptimidazol-2(1H)-one, precipitated in the reaction mixture after completion of the reaction, is filtered off, the filtrate is concentrated under reduced pressure and to the residue water is added followed by acidification with hydrochloric acid. The desired product thus precipitated is extracted with ether The ether layer is washed with water and dried over a drying agent. The desired product may be isolated in free form from the extract, but it is conveniently converted to a non-toxic salt such a the sodium or potassium salt. For example, addition of a solution of sodium 2-ethylhexanoate to the extract readily results in formation of the sodium salt of the desired product.

The 6-aminopenicillanic acid compounds having the general Formula I are known as antibiotics and administered orally or intramuscularly in a dose of about 100 mg. to 500 mg. The total daily dosage for adults is usually about 500 mg. to 2.0 g. The compound having Formula II used in the process of this invention as the starting material is a novel compound which is easily produced, for example, by reacting 1-haloacetylcycloheptimidazol-2(1H)-one with sodium tetrolate.

The following examples are given below to illustrate the invention more specifically.

EXAMPLE A

Preparation of the starting material (II)

To 81.6 g. of potassium salt of cycloheptimidazol-2(1H)-one are added 1 l. of tetrahydrofuran and the mixture is cooled at 10° C.

To the mixture are added dropwise 80.7 g. of trichloroacetyl chloride in 100 ml. of tetrahydrofuran over 15 minutes with stirring. The mixture is heated under reflux for 45 minutes and then cooled at 20° C. To the mixture are added 47 g. of sodium tetrolate. The resulting mixture is stirred at room temperature for 3 hours. The reaction mixture is filtered to separate crystals and the filtrate is concentrated under reduced pressure. The crystalline residue is combined with the crystals obtained above. To the crystals are added 1.5 l. of chloroform. The mixture is thoroughly shaken and washed three times with water. The chloroform layer is dried over anhydrous sodium sulfate and the solvent is distilled off. To the residue is added acetone and the crystals produced are separated by filtration, washed with acetone and dried to give 80 g. of 1-tetrolylcycloheptaimidazol - 2(1H) - one, darkening at about 160° C.

EXAMPLE 1

To 21.2 g. of 1-tetrolylcycloheptimidazol-2(1H)-one are added 300 ml. of tetrahydrofuran. To the mixture heated under reflux with stirring are added 30 g. of 2,6-dichlorobenzonitrile N-oxide. Heating under reflux with stirring is continued for three hours. The solvent is removed under reduced pressure from the reaction mixture. To the residue is added benzene for dissolution with heating and the solution is cooled to precipitate crystals. The crystals are separated by filtration, washed with benzene and dried to give 24 g. of crystalline 1-[3-(2,6-dichlorophenyl)-5-methylisoxazole-4-carbonyl]cycloheptimidazol-2(1H)-one, M.P. 164° C.

To a solution prepared from 4.32 g. of 6-aminopenicillanic acid 7 ml. of water, 2.2 g. of triethylamine, 40 ml. of isopropanol and 5 ml. of hexamethylphosphoric triamide are added 8.8 g. of the crystals obtained above. The mixture is stirred at room temperature for seven hours. The reaction mixture is filtered to separate crystalline cycloheptimidazol-2(1H)-one and the filtrate concentrated under reduced pressure at 25° C. or below.

To the residue are added 50 ml. of water and 100 ml. of ether and the mixture treated with 10% hydrochloric acid with stirring under cooling with ice to adjust the pH to 2.5, followed by separation of the ether layer. The ether layer is washed with water and dried over anhydrous sodium sulfate. To the solution are added 10 ml. of a 2 molar n-butanol solution of sodium 2-ethylhexanoate. The colorless crystals thus precipitated are separated by filtration, washed with ether and dried in vacuo to give 7.8 g. of the sodium salt monohydrate of 3-(2,6-dichlorophenyl)-5-methyl-4-isoxazolylpenicillin.

EXAMPLE 2

The reaction is carried out in the same way as in the preceding Example 1 except that 24 g. of 2-chlorophenylbenzonitrile N-oxide is used in place of the 2,6-dichlorobenzonitrile N-oxide and the after treatment affords 1-[3-(2 - chlorophenyl) - 5 - methylisoxazole - 4 - carbonyl] cycloheptimidazol - 2(1H) - one melting at 200° C. Reaction of 8.0 g. of the compound with 6-aminopenicillanic acid is carried out in the same way as in Example 1 and the after treatment gives the sodium salt of 3-(2-chlorophenyl)-5-methyl-4-isoxazolylpenicillin.

EXAMPLE 3

The reaction is carried out in the same way as in Example 1 except that 19 g. of benzonitrile N-oxide is used in place of the 2,6-dichlorobenzonitrile N-oxide and the after treatment affords 1-(3-phenyl-5-methylisoxazole-4-carbonyl)-cycloheptimidazol-2(1H)-one, M.P. 167° C. Reaction of 7.3 g. of the compound with 6-aminopenicillanic acid is carried out in the same way as in Example 1 and the after treatment gives 3-phenyl-5-methyl-4-isoxazolylpenicillin.

EXAMPLE 4

To a solution of 2.16 g. of 6-aminopenicillanic acid in 10 ml. of water and 1.01 g. of triethylamine are added 4.0 g. of 1-[3-(2,6-dichlorophenyl)-5-methylisoxazole-4-carbonyl]cycloheptimidazol-2(1H)-one and 40 ml. of acetone. The solution is stirred at room temperature for 6 hours. The crystals of cycloheptimidazol-2(1H)-one which precipitate are separated by filtration and the acetone distilled off under reduced pressure from the filtrate. To the residue are added 20 ml. of water and 50 ml. of ether followed by the addition of 10% hydrochloric acid under cooling with ice to adjust the pH to 2.5. The ether layer is separated, washed with water and dried over anhydrous sodium sulfate. To the resulting solution are added 5 ml. of a 2 molar n-butanol solution of sodium 2-ethylhexanoate. The colorless crystals thus precipitated are separated by filtration, washed with ether and dried in vacuo to give 3.98 g. of the sodium salt monohydrate of 3-(2,6-dichlorophenyl)-5-methyl-4-isoxazolylpenicillin.

EXAMPLE 5

To a solution of 2.16 g. of 6-aminopenicillanic acid in 40 ml. of methylene chloride and 2.2 g. of triethylamine are added 4.82 g. of one molar benzene adduct of 1-[3-(2,6 - dichlorophenyl) - 5 - methylisoxazole - 4 - carbonyl]cycloheptimidazol-2(1H)-one. The mixture is stirred at room temperature for 6 hours. The reaction mixture is then treated in the same way as in Example 4 to give 3.88 g. of the sodium salt monohydrate of 3-(2,6-dichlorophenyl)-5-methyl-4-isoxazolylpenicillin.

EXAMPLE 6

The reaction is carried out in the same way as in Example 4, substituting 5 ml. of water, 4.4 g. of 1-[3-(2,6-dichlorophenyl) - 5 - methylisoxazole-4-carbonyl]cycloheptimidazol-2(1H)-one and 10 ml. of hexamethylphosphoric triamide for 10 ml. of water, 4.0 g. of said cycloheptimidazolone and 40 ml. of acetone and the after treatment affords 4.8 g. of the sodium salt monohydrate of 3-(2,6-dichlorophenyl)-5-methyl-4-isoxazolylpenicillin.

EXAMPLE 7

The reaction is carried out in the same way as in Example 6 except that a mixture of 30 ml. of isopropanol and 2 ml. of hexamethylphosphoric triamide is used in place of 10 ml. of hexamethylphosphoric triamide and the after treatment affords 4.8 g. of the sodium salt monohydrate of 3-(2,6-dichlorophenyl)-5-methyl-4-isoxazolylpenicillin.

EXAMPLE 8

The reaction is carried out in the same way as in Example 6 except that 4.0 g. of 1-[3-(2-chlorophenyl)-5-methylisoxazole - 4 - carbonyl]cycloheptimidazol-2(1H)-one is used in place of the 1-[3-(2,6-dichlorophenyl)-5-methylisoxazole - 4 - carbonyl]cycloheptimidazol-2(1H)-one and the after treatment affords 4.2 g. of the sodium salt monohydrate of 3 - (2 - chlorophenyl) - 5 - methyl-4-isoxazolylpenicillin.

What is claimed is:
1. A process for producing a 6-aminopenicillanic acid derivative having the formula

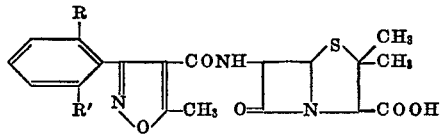

wherein R and R' may be the same or different and each represents a hydrogen atom or a halogen atom, and nontoxic salts thereof, which comprises suspending or dissolving in a solvent 6-aminopenicillanic acid or a salt thereof and contacting at about room temperature with a cycloheptimidazolone derivative having the formula

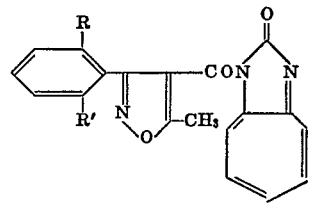

wherein R and R' have the same meaning as above.

2. A process of claim 1 wherein the reaction is carried out in the presence of a tertiary alkyl amine or aromatic heterocyclic amine.

3. The process of claim 1 wherein both R and R' are chlorine.

4. The process of claim 1 wherein R is chlorine and R' is hydrogen.

5. The process of claim 1 wherein both R and R' are hydrogen.

6. A process for preparing a 6-aminopenicillanic acid compound having the formula

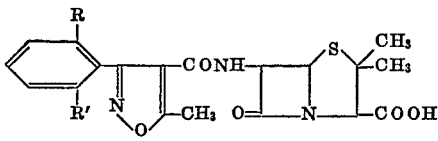

wherein R and R' may be the same or different and each represents a hydrogen atom or a halogen atom, which comprises contacting in an inert solvent at a temperature from room temperature to about 130° C. a compound having the formula

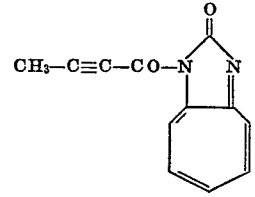

with a nitrile oxide having the formula

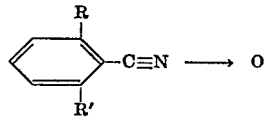

wherein R and R' have the same meaning as above, to form a cycloheptimidazolone compound having the formula

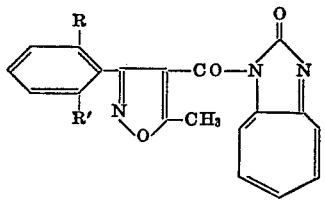

wherein R and R' have the same meaning as above, and then contacting said compound with 6-aminopenicillanic acid or a salt thereof in a solvent at about room temperature.

7. The process of claim 6 wherein the reaction is carried out in the presence of a tertiary alkyl amine or aromatic heterocyclic amine.

8. The process of claim 6 wherein both R and R' are chlorine.

9. The process of claim 6 wherein R is chlorine and R' is hydrogen.

10. The process of claim 6 wherein both R and R' are hydrogen.

References Cited

UNITED STATES PATENTS

| | | | |
|---|---|---|---|
| 2,996,501 | 8/1961 | Doyle et al. | 260—239.1 |
| 3,239,507 | 3/1966 | Nayler et al. | 260—239.1 |
| 3,341,518 | 9/1967 | Naito et al. | 260—239.1 |
| 3,534,020 | 10/1970 | Essery et al. | 260—239.1 |

NICHOLAS S. RIZZO, Primary Examiner

U.S. Cl. X.R.

260—307, 309.6